F. CARLFIELD.
HANDSAW.
APPLICATION FILED AUG. 30, 1916.

1,284,591.

Patented Nov. 12, 1918.

Inventor
Fritz Carlfield
By Victor J. Evans
Attorney

Witnesses

UNITED STATES PATENT OFFICE.

FRITZ CARLFIELD, OF SAN PABLO, CALIFORNIA.

HANDSAW.

1,284,591. Specification of Letters Patent. Patented Nov. 12, 1918.

Application filed August 30, 1916. Serial No. 117,733.

*To all whom it may concern:*

Be it known that I, FRITZ CARLFIELD, a subject of the King of Sweden, residing at San Pablo, in the county of Contra Costa and State of California, have invented new and useful Improvements in Handsaws, of which the following is a specification.

This invention is an improved combination tool and which I call a master saw and which is adapted to be used as a saw, a square, a triangle, and a measuring rule, the object of the invention being to provide an improved tool of this character which is simple in construction and is extremely useful to carpenters and other artisans.

The invention consists in the features of construction, combination, and arrangement of devices, hereinafter fully described and claimed.

In the accompanying drawings:—

Figure 1:
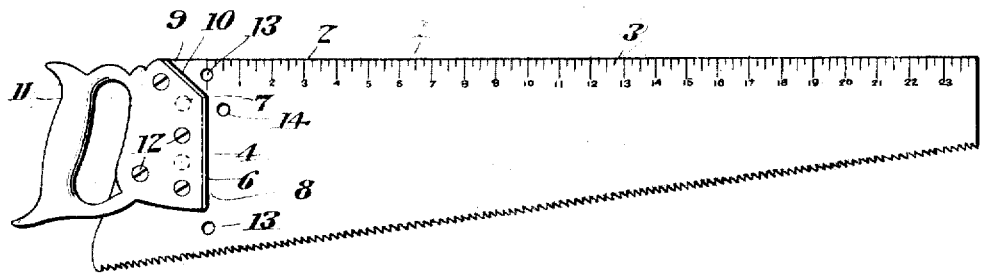
Figure 1 is a side elevation of a master saw constructed and arranged in accordance with my invention.
Figure 2:
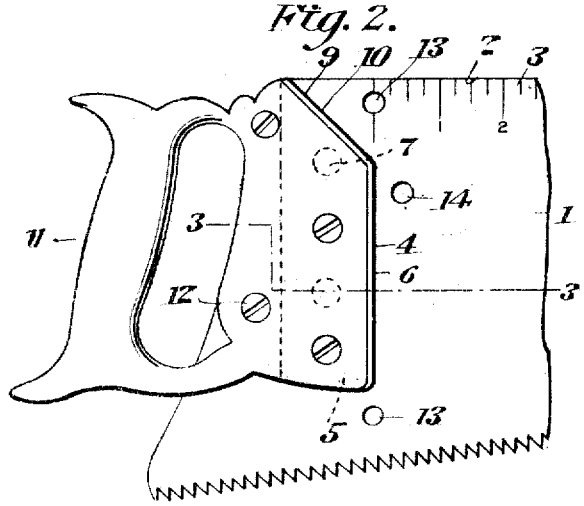
Fig. 2 is a fragmentary elevation of the same on a larger scale.
Figure 3:
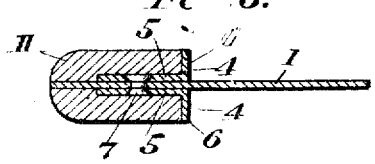
Fig. 3 is a fragmentary sectional view of the same on the plane indicated by the line 3—3 of Fig. 2.

The saw blade 1 which is of the usual shape, has a straight back edge 2 and is provided at the back and on both sides with measuring scales 3.

Near the broadened end of the blade and on opposite sides are shoes 4, which may be made of steel or of any other suitable material and which are right angular in cross section, each comprising a broad web 5 to bear on the saw blade and a narrow web 6 which projects out from the saw blade and at right angles thereto. The said shoes are arranged directly opposite each other on opposite sides of the saw blade and are secured thereto by rivets 7. Each shoe has a straight edge 8 arranged transversely of the blade, at right angles to the straight back edge 2 of the blade and directly in line with the inner end of one of the scales or rules 3. Each shoe also has an offset 9 which provides a straight edge 10, arranged at an angle of forty-five degrees to the straight edge 8 and also arranged at an angle of forty-five degrees to the straight edge 2 of the saw blade. The handle 11 is of the usual form, is rabbeted to receive the web 5 of the shoes and is shaped at its inner edge to abut against the webs 6 of the shoes and their offset portions 9. The handle is secured by the usual screws 12.

In the use of the tool as a square, the straight edge 8 of one of the shoes will be arranged against one side or edge of the work, thus disposing the straight edge 2 of the saw blade at exactly right angles to and across the work as will be understood. When the straight edge 10 of one of the shoes is thus arranged against one side or edge of the work, the straight edge 2 of the saw blade will extend across the work at an angle of 45 degrees with respect to said edge or side of the work as will be understood so that the tool is thus adapted for use as a bevel. The edge 10 may be of any other angle than 45 degrees if preferred within the scope of my invention.

To facilitate the use of the tool as a square or bevel and make it certain that the edges 8 or 10 are in proper relation to the edge of the work, I provide the blade with sight holes 13, the centers of which are directly in line with and spaced from the ends of the edge 8 and I also provide the blade with a sight hole 14 the center of which is directly in line with and spaced from the inner end of the edge 10. Through these holes, the edge or side of the piece of work may be observed as will be understood.

Having described the invention, what is claimed is:

A tool having a member provided with a straight back edge and a shoe on the said member and having a straight edge at right-angles to and terminating short of the back edge of the member, said shoe also having a straight edge at an angle other than a right-angle to the first mentioned straight edge of said shoe and extending to the back edge of the member, the member being further provided with sight holes in line with and at the ends of the said edges of the shoe.

In testimony whereof I affix my signature.

FRITZ CARLFIELD.